(12) United States Patent
Tujkovic

(10) Patent No.: US 10,973,085 B2
(45) Date of Patent: Apr. 6, 2021

(54) POLARITY ASSIGNMENT IN A MULTI-HOP WIRELESS NETWORK

(71) Applicant: FACEBOOK, INC., Menlo Park, CA (US)

(72) Inventor: Djordje Tujkovic, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 16/799,506

(22) Filed: Feb. 24, 2020

(65) Prior Publication Data

US 2020/0196386 A1 Jun. 18, 2020

Related U.S. Application Data

(63) Continuation of application No. 15/392,863, filed on Dec. 28, 2016, now Pat. No. 10,582,567.

(Continued)

(51) Int. Cl.
| | |
|---|---|
| *H04W 84/18* | (2009.01) |
| *H04W 72/04* | (2009.01) |
| *H04L 12/24* | (2006.01) |
| *H04W 24/04* | (2009.01) |
| *H04W 84/10* | (2009.01) |
| *H04W 16/28* | (2009.01) |

(52) U.S. Cl.
CPC ............. *H04W 84/18* (2013.01); *H04L 41/12* (2013.01); *H04W 24/04* (2013.01); *H04W 72/0446* (2013.01); *H04W 16/28* (2013.01); *H04W 84/10* (2013.01)

(58) Field of Classification Search
None
See application file for complete search history.

(56) References Cited

U.S. PATENT DOCUMENTS

2008/0159316 A1 7/2008 Dutta et al.
2010/0185649 A1 7/2010 Zhou et al.

OTHER PUBLICATIONS

Faria et al, Odd Cycle Transversals and INdependent Sets in Fullerene Graphs, SIAM J. Discrete Math, vol. 26, pp. 1458-1469 (Year: 2012).

(Continued)

*Primary Examiner* — Yaotang Wang
(74) *Attorney, Agent, or Firm* — Artegis Law Group, LLP

(57) ABSTRACT

In one embodiment, a method includes determining a plurality of network nodes of a multi-hop wireless network, wherein each network node comprises an array of beamforming antennae; assigning to each network node in a first subset a first bipartite-graph polarity; assigning to each network node in a second subset a second bipartite-graph polarity; and configuring the multi-hop wireless network according to a bipartite-graph representation of the multi-hop wireless network. During first time slots network nodes of the first bipartite-graph polarity transmit to network nodes of the second bipartite-graph polarity and network nodes of the second bipartite-graph polarity receive from network nodes of the first bipartite-graph polarity. During second time slots that alternate with the first time slots, network nodes of the second bipartite-graph polarity transmit to network nodes of the first bipartite-graph polarity and network nodes of the first bipartite-graph polarity receive from network nodes of the second bipartite-graph polarity.

20 Claims, 5 Drawing Sheets

Related U.S. Application Data

(60) Provisional application No. 62/274,135, filed on Dec. 31, 2015.

(56) References Cited

OTHER PUBLICATIONS

Liu et al, Building a Scalable Bipartite P2P Overlay Network, Sep. 2007, IEEE vol. 9, p. 1296 (Year: 2007).

POLARITY ASSIGNMENT IN A MULTI-HOP WIRELESS NETWORK

CROSS-REFERENCE TO RELATED APPLICATIONS

This application is a continuation of the co-pending U.S. patent application titled, "POLARITY ASSIGNMENT IN A MULTI-HOP WIRELESS NETWORK," filed on Dec. 28, 2016 and having Ser. No. 15/392,863, which claims priority benefit of the U.S. Provisional Patent Application No. 62/274,135, filed Dec. 31, 2015. The subject matter of these related application is hereby incorporated herein by reference.

TECHNICAL FIELD

This disclosure generally relates to wireless communication networks.

BACKGROUND

A multi-hop wireless network may facilitate the communication of data where wired communication is unavailable, impractical, or impossible. For example, a multi-hop wireless network may serve as a wireless backhaul network connecting a core or backbone network to one or more customer networks. A customer network may include customer equipment (CE)—such as Wi-Fi access points (APs), cellular base stations (such as femtocells), and related equipment or other CE—providing wireless or wired connectivity to one or more client devices. A client device may be a desktop or laptop computer, tablet, mobile telephone, appliance, or other client device.

A multi-hop wireless network may include multiple wirelessly interconnected network nodes. A wireless CONNECTION between two network nodes may be a hop, and data may be communicated wirelessly through the network from one edge to another along one or more network paths traversing series of network nodes and hops. All or some of the network nodes may be at fixed locations. For example, all or some of the network nodes may be affixed to street lamps, utility poles, other street furniture, or building exteriors. All or some of the network nodes may act as distribution nodes (DNs) or customer nodes (CNs). A DN may wirelessly communicate with CNs or other DNs to relay data through the network. One or more DNs may also communicate with one or more edge devices of a core or backbone network to connect the multi-hop wireless network to the core or backbone network. A CN may communicate with DNs and CEs to connect a customer network to the multi-hop wireless network.

SUMMARY OF PARTICULAR EMBODIMENTS

In particular embodiments, a method of assigning a first polarity to a first subset of network nodes and assigning a second polarity to a second subset of network nodes in a multi-hop wireless network and APPLYING bipartization techniques may increase the operability and efficiency of the multi-hop network. The multi-hop wireless network may operate in a time division duplex (TDD) scheme, in which both transmission and reception occur over a single frequency band (e.g. 60 GHz) by alternating time slots between transmit and receive for a given network node. For example, during even time slots, a given network node may transmit data, and during odd time slots the network node may receive data. In order for information to pass between multiple network nodes in a multi-hop wireless network, during a given time slot, half of the nodes may need to be transmitting and the other half may need to be receiving. Thus, it may be desirable to assign particular network nodes a first polarity, and to assign other network nodes a second polarity.

To ensure delivery of messages across a multi-hop wireless network, network nodes assigned a first polarity may require neighboring network nodes to be assigned a second polarity. Network nodes assigned the second polarity may likewise require other neighboring nodes to be assigned the first polarity. This way, data may be able to "hop" across the multi-hop wireless network. For example, a message may "hop" (e.g. transmit) from and even network node to an odd network node, to an even network node, to an odd network node, and so on. To determine which network nodes to assign a particular polarity, it may be desirable to characterize the multi-hop wireless network as a bipartite graph. A bipartite graph may be described as multiple vertices with edges connecting the vertices. Each vertex in a BIPARTITE graph may be categorized in one of two categories. No two vertices of the same category may be connected by an edge. Bipartite graphs may be useful in situations in which two different types of objects exist that need to be connected in some way (e.g. transmit network nodes need to wirelessly connect with receive network nodes).

Changes to the topology of the multi-hop wireless network may result in the multi-hop wireless network losing its BIPARTITE quality. This may be undesirable because the multi-hop wireless network may operate more efficiently when it operates as a bipartite graph. To cause the multi-hop wireless network to return to operating according to a bipartite-graph representation, it may be useful to perform edge bipartization, because edge bipartization does not require the removal of network nodes nor the installation of new network nodes.

DESCRIPTION OF EXAMPLE EMBODIMENTS

Figure 1:
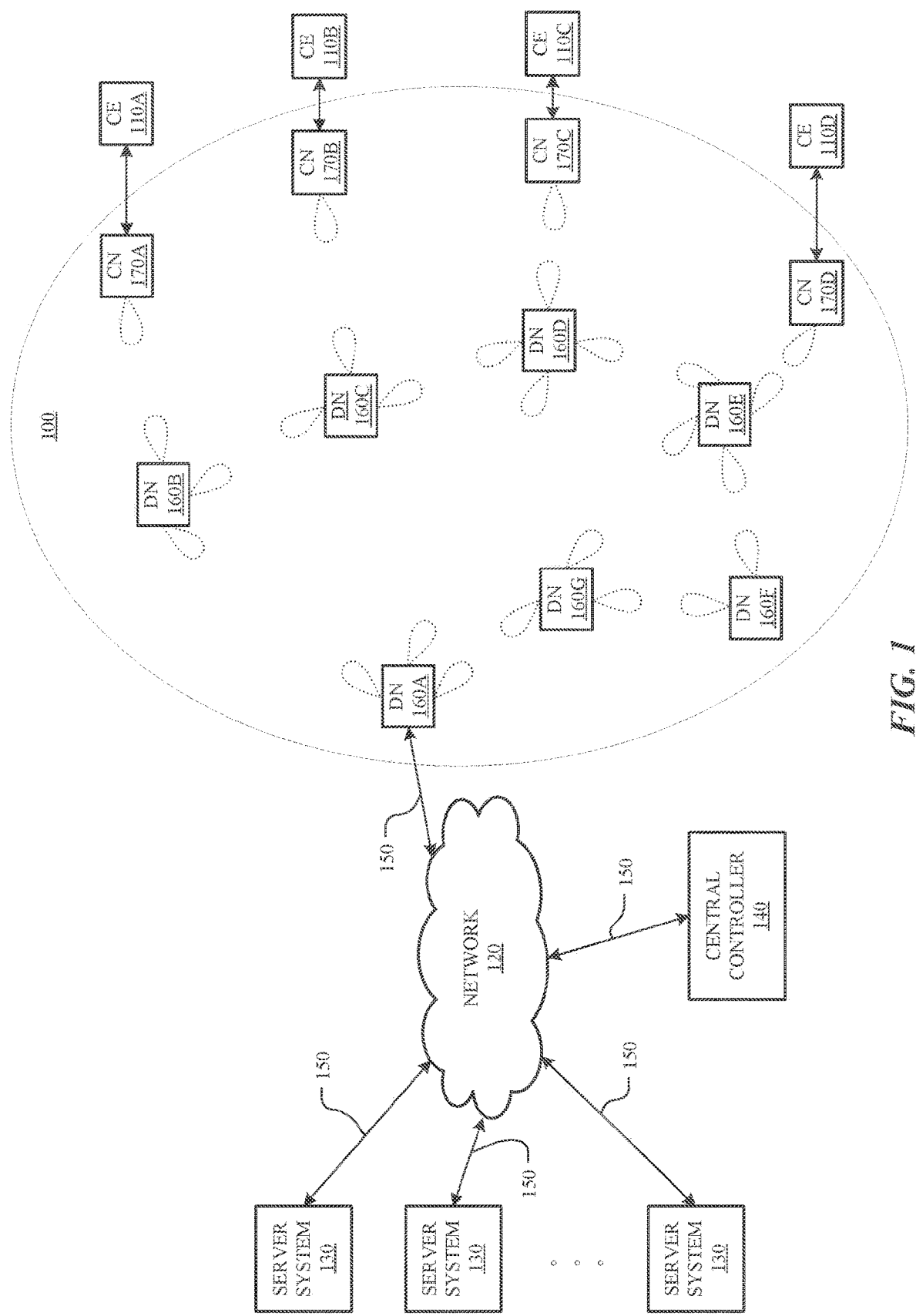
FIG. 1 illustrates an EXAMPLE multi-hop wireless network.

In particular embodiments, a method of assigning a first polarity to a first subset of network nodes and assigning a second polarity to a second subset of network nodes in a multi-hop wireless network and applying bipartization techniques may increase the operability and efficiency of the multi-hop network. The multi-hop WIRELESS network may operate in a time division duplex (TDD) scheme, in which both transmission and reception occur over a single frequency band (e.g. 60 GHz) by alternating time slots between transmit and receive for a given network node. For example, during even time slots, a given network node may transmit data, and during odd time slots the network node may receive data. In order for information to pass between multiple network nodes in a multi-hop wireless network, during a given time slot, half of the nodes may need to be transmitting and the other half may need to be receiving. Thus, it may be desirable to assign particular network nodes a first polarity, and to assign other network nodes a second polarity.

To ensure delivery of messages across a multi-hop wireless network, network nodes assigned a first polarity may require neighboring network nodes to be assigned a second polarity. Network nodes assigned the second POLARITY may likewise require other neighboring nodes to be assigned the first polarity. This way, data may be able to "hop" across the multi-hop wireless network. For example, a message may "hop" (e.g. transmit) from and even network node to an odd network node, to an even network node, to an odd network node, and so on. To determine which network nodes to assign a particular polarity, it may be desirable to characterize the multi-hop wireless network as a bipartite graph. A bipartite graph may be described as multiple vertices with edges connecting the vertices. Each vertex in a bipartite graph may be categorized in one of two categories. No two vertices of the same category may be connected by an edge. Bipartite graphs may be useful in situations in which two different types of objects exist that need to be connected in some way (e.g. transmit network nodes need to wirelessly connect with receive network nodes).

Changes to the TOPOLOGY of the multi-hop wireless network may result in the multi-hop wireless network losing its bipartite quality. This may be undesirable because the multi-hop wireless network may operate more efficiently when it operates as a bipartite graph. To cause the multi-hop wireless network to return to operating according to a bipartite-graph representation, it may be useful to perform edge bipartization, because edge bipartization does not require the removal of network nodes nor the installation of new network nodes.

In particular embodiments, the multi-hop wireless network may operate in a time division duplex (TDD) scheme, in which both transmission and reception occur over a single frequency band (e.g. 60 GHz) by alternating time slots between transmit and receive for a given network node. For example, during even time slots, a given network node may transmit data, and during odd time slots the network node may receive data. In order for information to pass between multiple network nodes in a multi-hop wireless network, during a given time slot, half of the nodes may need to be transmitting and the other half may need to be receiving. Thus, it may be desirable to assign particular network nodes a first polarity, and to assign other network nodes a second polarity. As an example and not by way of limitation, in a multi-hop wireless network, half of the network nodes may be assigned an "even" polarity, and the other half may be assigned an "odd" polarity. It may be determined that during even time slots (e.g. time slots 0, 2, 4, 6, etc.) the network nodes assigned an even polarity will transmit data, and the network nodes assigned an odd polarity will receive data. During odd time slots (e.g. time slots 1, 3, 5, etc.) the roles may switch, so that even network nodes receive data, and odd network nodes transmit data.

In particular embodiments, network nodes may comprise one or more sectors, each sector comprising an antenna array capable of beamforming. Each sector may be oriented in a particular direction. As an example and not by way of limitation, a street pole may have four separate antenna arrays on it, one antenna array facing north, one facing south, one facing east, and one facing west. In this example, the street pole may be the network node, and the antenna arrays may be sectors. In a TDD scheme, all four sectors on a given network node may either receive or transmit at the same time. As an example and not by way of limitation, it may be determined that during even time slots (e.g. time slots 0, 2, 4, 6, etc.) all sectors on network nodes assigned an even polarity will transmit data, and all sectors on network nodes assigned an odd polarity will receive data. During odd time slots (e.g. time slots 1, 3, 5, etc.) the roles may switch, so that sectors on even network nodes receive data, and sectors on odd network nodes transmit data.

In particular embodiments, a multi-hop wireless network may operate in a time division multiplexing (TDM) scheme, wherein more than two independent signals may be transmitted and received over a single FREQUENCY band (e.g. 60 GHz). Using a TDM scheme, a given network node may be able to both transmit and receive in a given time slot by way of the network node's sectors. As an example and not by way of limitation, during a first time slot, two sectors on the network node may transmit and two sectors on the network node may receive. A TDM scheme may be desirable in particular situations in which multiple signals need to be transmitted.

When a multi-hop WIRELESS network is actually installed, ignited, and otherwise implemented, it may be difficult to determine which network nodes to assign a first polarity and which network nodes to assign a second polarity. This difficulty may arise because the network nodes may have a limited transmission range (e.g. 200 meters). Thus, network nodes assigned a first polarity may require neighboring network nodes to be assigned a second polarity. Network nodes assigned the second polarity may likewise require other neighboring nodes to be assigned the first polarity. This way, data may be able to "hop" across the multi-hop wireless network. For example, a message may "hop" (e.g. transmit) from and even network node to an odd network node, to an even network node, to an odd network node, and so on.

To determine which network nodes to assign a particular polarity, it may be desirable to characterize the multi-hop wireless network as a bipartite graph. A bipartite graph may be described as multiple vertices with edges connecting the vertices. Each vertex in a bipartite graph may be categorized in one of two categories. No two vertices of the same category may be connected by an edge. Bipartite graphs may be useful in situations in which two different types of objects exist that need to be connected in some way (e.g. transmit network nodes need to wirelessly connect with receive network nodes).

FIG. 1 illustrates an example multi-hop wireless network 100. In the example of FIG. 1, multi-hop wireless network 100 connects CE 110 at customer premises (such as residences or places of businesses) to a core or backbone network 120 (which may include one or more portions of the Internet). Network 120 connects multi-hop wireless network 100 to one or more server systems 130. NETWORK 120 may also connect central controller 140 to multi-hop wireless network 100. In addition or as an alternative, central controller 140 may where appropriate connect to one or more network nodes of multi-hop wireless network 100 directly, for example, through out-of-band signaling by 2G, 3G, or 4G mobile telecommunications. Communication between central controller 140 and a network node of multi-hop through network 120 may be referred to as in-band. Links 150 may connect multi-hop wireless network 100, server systems 130, and central controller 140 to network 110. This disclosure contemplates any suitable links 150 for these connections. For example, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links, where appropriate. In particular embodiments, one or more links 150 may each include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the PSTN, a 2G, 3G, or 4G mobile-telecommunications network, a satellite communications network, another link 150, or a combination of two or more such links 150, where appropriate. Links 150 are not necessarily the same throughout the network environment of FIG. 1. One link 150 may differ from another in one or more respects. Although the example of FIG. 1 is described and illustrated with a particular network environment including a particular number of particular systems and components arranged in a particular manner, this disclosure contemplates any suitable network environment including any suitable number of any suitable systems and components arranged in any suitable manner. For example, two or more of multi-hop wireless network 100, server systems 130, or central controller 140 may be connected to each other directly, bypassing network 120. As another example, two or more of multi-hop wireless network 100, server systems 130, or central controller 140 may be physically or logically co-located with each other in whole or in part.

A server system 130 may provide services (such as web services) to client and other devices and systems. For example, a server system 130 may include one or more web servers, news servers, mail servers, message servers, advertising servers, file servers, application servers, exchange servers, database servers, proxy servers, other suitable servers, or a suitable combination thereof. A server system 130 may include hardware, software, or embedded logic components or a combination of two or more such components for carrying out the functions implemented or supported by server system 130. In addition, a server system 130 may include one or more servers and be a unitary server system or a distributed server system spanning multiple computer systems or multiple datacenters. Although this disclosure describes and illustrates particular server systems, this disclosure contemplates any suitable server systems.

Central controller 140 may act as a central controller for multi-hop wireless network 100, which may include coordinating ignition of DNs 160 and CNs 170, as described below. Central controller 140 may include hardware, software, or embedded logic components or a combination of two or more such components for carrying out its functions. In addition, central controller 140 may include one or more servers and be a unitary computer system or a distributed computer system spanning multiple computer systems or multiple datacenters. Central controller 140 may be connected to multi-hop wireless network 100 by network 120. In addition or as an alternative, central controller 140 may where appropriate connect to one or more network nodes of multi-hop wireless network 100 directly, for example, through out-of-band signaling by 2G, 3G, or 4G mobile telecommunications. Communication between central controller 140 and a network node of multi-hop through network 120 may be referred to as in-band. Although this disclosure describes and illustrates a particular central controller 140, this disclosure contemplates any suitable central controller 140.

In the example of FIG. 1, multi-hop wireless network 100 includes multiple DNs 160 and CNs 170. A DN 160 wirelessly communicates with one or more CNs 170 or one or more other DNs 160 to relay data through multi-hop wireless network 100. DN 160A also communicates through a link 150 with ONE or more edge devices of network 120 to connect multi-hop wireless network 100 to network 120, providing a point-of-presence (PoP) for multi-hop wireless network 100 on network 120. A CN 170 communicates with one or more DNs 160 and CE 110 to connect a customer network to the multi-hop wireless network. One or more wireline or other suitable links may connect a CN 170 to CE 110. A CE 100 may be part of a customer network located for example at a customer premises and may include one or more Wi-Fi APs, cellular base stations (such as femtocells), and related equipment or other CEs providing wireless or wired connectivity to one or more client devices. A client device may be an electronic device including hardware, software, or embedded logic components or a combination of two or more such components designed to carry out particular functions implemented or supported by the client device. For example, a client device may be a desktop or laptop computer, tablet, e-book reader, GPS device, camera, mobile telephone, appliance, augmented-reality or virtual-reality device, another suitable client device, or a suitable combination thereof. This disclosure contemplates any suitable client devices.

As described above, multi-hop wireless network 100 includes multiple DNs 160 and CNs 170. Wireless communication in multi-hop wireless network 100 may be point-to-point, and DNs 160 and CNs 170 may communicate WIRELESSLY with each other in one or more frequency bands at or around 60 GHz. A DN 160 or CN 170 may have a maximum range of approximately 1.5 kilometers, but may typically communicate with other DNs 160 or CNs within approximately 200-300 meters. All or some of DNs 160 and CNs 170 the network nodes may be at fixed locations. For example, all or some of DNs 160 and CNs 170 may be affixed to street lamps, utility poles, other street furniture, or building exteriors.

A network node of multi-hop wireless network 100 may include one or more antenna arrays that are each capable of beamforming to direct signal transmission or reception by network node. A single antenna array capable of beamforming may be referred to as a sector. If a network node has multiple sectors, they will likely face different directions. For example, a network node affixed to a street pole could have four separate antenna arrays on it, with one facing north, one facing east, one facing south, and one facing west. To aim a sector for transmission or reception, the beamforming weight of the antenna array constituting the sector may be adjusted. A micro-route is a gross reflection or line of site between two sectors. A nano-route is a fine reflection or line of site between two sectors. Typically, a micro-route between two sectors has several possible nano-routes. Some of those nano-routes will provide better link capacity between the two sectors, and some of those nano-routes will interfere more with neighboring nodes. In the example of FIG. 1, the directions of the sectors of DNs 160 and CNs 170 for transmission and reception are shown as lobes with dashed lines. Each of these lobes represents a sector's main lobe (e.g. the direction of the greatest transmission power or reception sensitivity). A sector may also have side lobes and nulls, which are not shown in FIG. 1. In the example of FIG.

1, DN 160A has sectors aimed at DN 160B, DN 160D, and DN 160G; DN 160B has sectors aimed at DN 160A, DN 160C, and CN 170A; DN 160C has sectors aimed at DN 160B, DN 160D, and CN 170B; DN 160D has sectors aimed at DN 160A, DN 160C, DN 160E, and CN 170C; DN 160E has sectors aimed at DN 160D, DN 160F, DN 160G, and CN 170D; DN 160F has sectors aimed at DN 160E and DN 160G; DN 160G has sectors aimed at DN 160A, DN 160E, and DN 160F; CN 170A has a sector aimed at DN 160B; CN 170B has a sector aimed at DN 160C; CN 170C has a sector aimed at DN 160D; and CN 170D has a sector aimed at DN 160E. As described below, the sectors of DNs 160 and CNs 170 may be dynamically re-directed by changing the beamforming weights of the respective antenna arrays. Moreover, as further described below, the sectors of particular DNs 160 and CNs 170 may be dynamically re-directed in response to particular events. Although this disclosure describes and illustrates a particular example multi-hop wireless network with a particular number of particular network nodes in a particular arrangement with particular numbers of particular beamforming antenna arrays aimed in particular directions, this disclosure contemplates any suitable multi-hop wireless network with any suitable number of any suitable network nodes in any suitable arrangement with any suitable numbers of any suitable beamforming antenna arrays aimed in any suitable directions.

Figure 2:
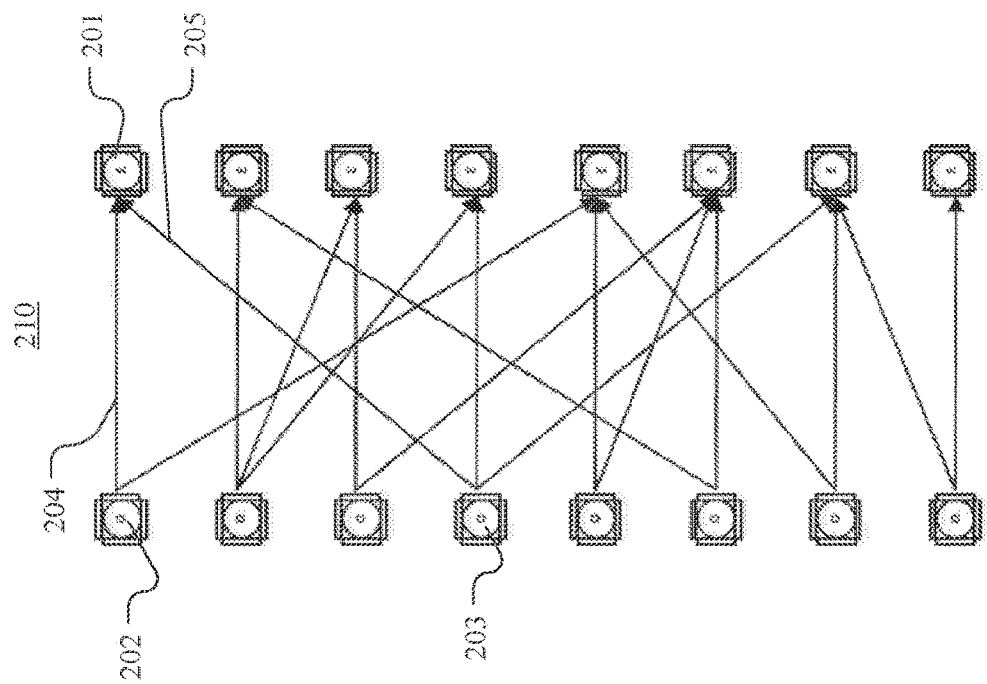
FIG. 2 illustrates a top-down perspective of example network nodes with wireless connections and an example conversion to a corresponding bipartite-graph representation.
Figure 2:
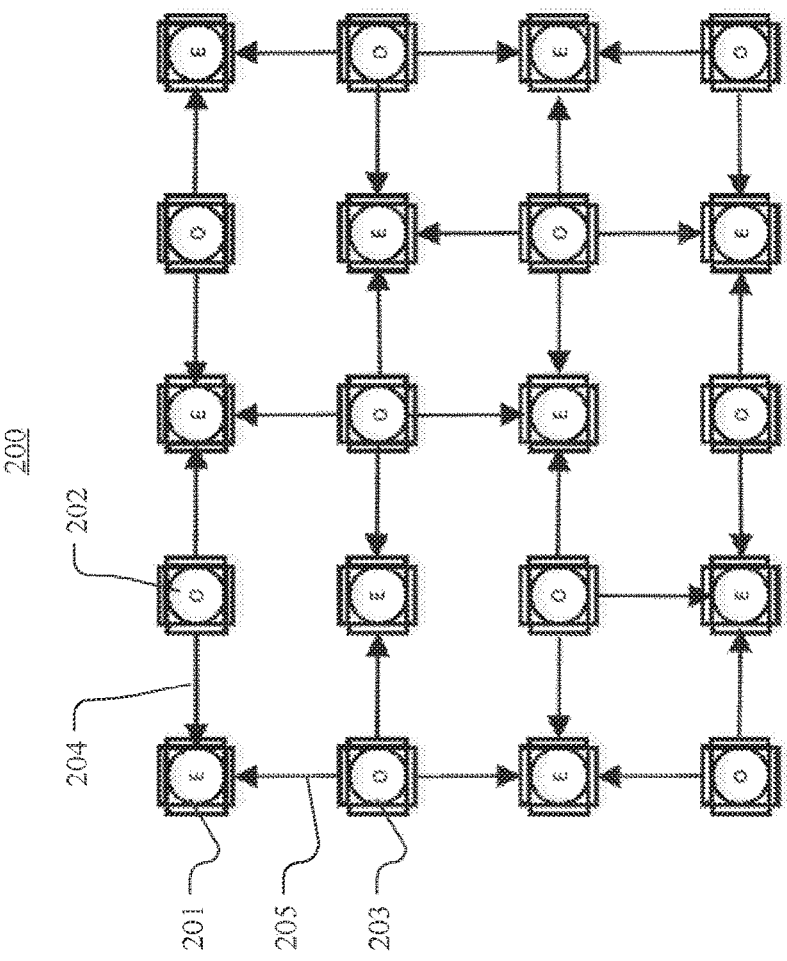

FIG. 2 illustrates a top-down perspective 200 of example network nodes with wireless connections and an example conversion to a corresponding bipartite-graph representation. Network node 201 may be assigned a first polarity. Network nodes 202 and 203 may be assigned a second polarity. In particular embodiments, the first and second assigned polarities may be a receiving polarity and a transmitting polarity, meaning that network node 201 may receive a transmitted signal from network nodes 202 and 203. As an example and not by way of limitation, network node 201 may be assigned a receiving polarity, and network nodes 202 and 203 may be assigned a transmitting polarity. Network node 201 may be wirelessly connected to network nodes 202 and 203 by links 204 and 205. In particular embodiments, network node 201 may send and receive signals with network nodes 202 and 203 according to a TDD scheme. The TDD scheme may operate as follows: for a first time slot, network nodes 202 and 203 may be assigned a transmitting polarity and network node 201 may be assigned a receiving polarity. During the first time slot, network nodes 202 and 203 may transmit signals to network node 201. For a second time slot, the operation may switch, wherein network node 201 may be assigned a transmitting polarity, and network nodes 202 and 203 may be assigned a receiving polarity. During the second time slot, network node 201 may transmit one or more signals to network nodes 202 and 203, which may receive the signal transmitted from network node 201. In particular embodiments, the above process may repeat multiple times, wherein the first and second time slots alternate. As an example and not by way of limitation, during even time slots, the network nodes assigned a first polarity may transmit signals while the network nodes assign a second polarity may receive signals. Continuing the example, during odd time slots the network nodes assigned a first polarity may receive signals while the network nodes assign a second polarity may transmit signals. This may ensure that for any given time slot, every transmitting network node has a receiving network node to which to transmit a signal.

The top-down perspective 200 may be reconfigured (e.g. re-characterized) as a bipartite-graph representation 210 of a multi-hop wireless network. A bipartite graph may be understood to mean a graph whose vertices can be divided into two disjoint sets. The vertices of the bipartite graph may be represented by the network nodes in this representation. Network nodes and wireless links that BEHAVE according to a bipartite-graph representation may adhere to two principles. First, no two vertices of the same set (e.g. polarity) may be connected. This may mean that there may not be a network node of a particular polarity that has a wireless connection to a network node of the same polarity. Second, cycles in a bipartite graph are even (e.g. 4, 6, 8 . . . ). As an example and not by way of limitation, a network node in the top-down perspective 200 may be marked with an "E" and another network node may be marked with an "O." In this scenario, it may be desirable that no network node marked with an "E" wirelessly connect with any other network node also marked with an "E." Rather, it may be desirable that network nodes marked with an "E" wirelessly connect with network nodes marked with an "O." In this way, the network illustrated in the top-down perspective 200 may be characterized as a bipartite-graph representation 210 of a multi-hop wireless network. In the bipartite-graph representation 210 of a multi-hop wireless network, receiving node 201 may still be wirelessly connected to transmitting nodes 202 and 203 by links 204 and 205. The nodes are merely rearranged to illustrate the bipartite graph quality of the top-down perspective 200.

Figure 3:
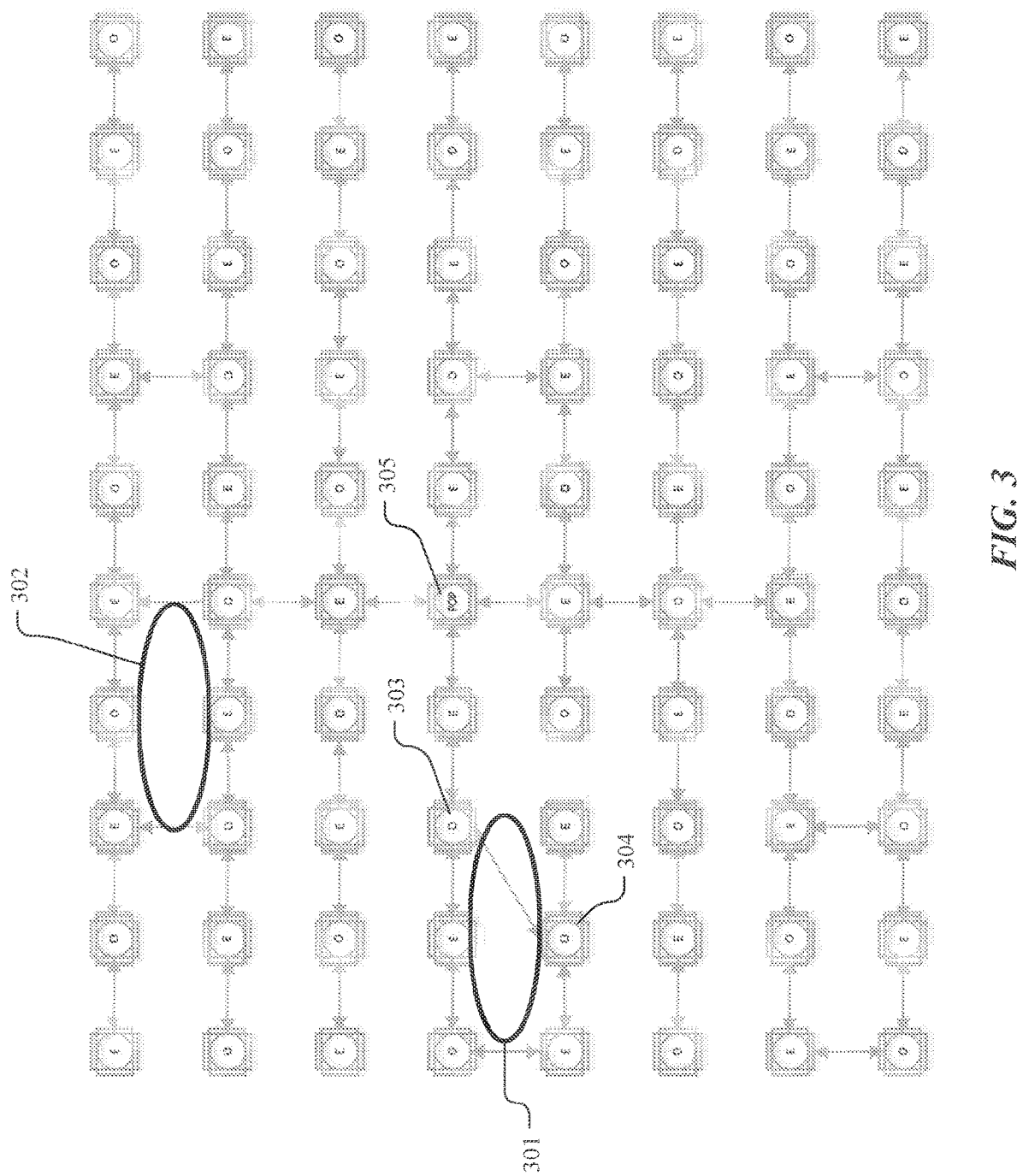
FIG. 3 ILLUSTRATES an example even cycle and an example odd cycle among a plurality of network nodes.

Changes to the topology of the multi-hop wireless network may result in the multi-hop wireless network losing its bipartite quality. That is, if a network node fails, or if another malfunction occurs, either or both of the two principles discussed above may be violated. As shown in FIG. 3, even cycle 302 passes through six network nodes. Even cycle 302 additionally does not comprise two nodes of the same polarity connected by a wireless connection. Because of these two qualities, it may be determined that the network nodes composing even cycle 302 may be functioning according to bipartite graph principles. Odd cycle 301, on the other hand, passes through five network nodes. Odd cycle 301 may have resulted for several reasons. First, a malfunctioning network node or some other malfunction on the multi-hop wireless network may cause the network nodes to operate differently than planned. Second, odd cycle 301 may have resulted from signal interference between signals from two or more network nodes in or surrounding odd cycle 301. Third, odd cycle 301 may have resulted from external forces such as severe weather or tampering. Additionally, odd cycle 301 comprises a wireless connection that connects two network nodes 303 and 304 having the same polarity. This may cause the multi-hop wireless network to lose its bipartite quality because all of its cycles are not even in length and two network nodes 303 and 304 having the same polarity are wirelessly connected. Such a network configuration may be undesirable because the multi-hop wireless network may operate more efficiently when it operates as a bipartite graph.

To cause the multi-hop wireless network to return to operating according to a bipartite-graph representation, it may be useful to perform one or more graph bipartization techniques to the multi-hop wireless network. There may be three approaches, any of which may be used to achieve a bipartite-graph representation of the multi-hop wireless network: odd cycle transversal, edge bipartization, and the injection of new network nodes of opposite polarity at appropriate locations. Odd cycle transversal returns, for a given graph topology, the minimum number of vertices k that need to be removed from the graph to make the graph bipartite. As the vertices are represented by network nodes, odd cycle transversal may involve removing one or more network nodes from the multi-hop wireless network. As an example and not by way of limitation, an odd cycle transversal of multi-hop wireless network 300 may return a value of 1, meaning that one network node must be removed from odd cycle 301 in order to make the multi-hop wireless network 300 operate according to a bipartite-graph representation. Although odd cycle transversal may be effective in achieving graph bipartization, it may not be desirable to remove network nodes from the multi-hop wireless network, as the removal of network nodes may decrease coverage and overall performance of the multi-hop wireless network.

Edge bipartization may return the minimum number of edges k that need to be removed from a graph to make the graph bipartite. Because the edges are represented by wireless connections between network nodes, edge bipartization may involve removing one or more wireless connections between two or more network nodes of a multi-hop wireless network. This may involve turning off or re-directing one or more antenna arrays on one or more network nodes. As an example and not by way of limitation, performing an edge bipartization algorithm of multi-hop wireless network 300 may return a value of 1, meaning that one wireless connection must be removed from odd cycle 301 in order to make the multi-hop wireless network 300 operate according to a bipartite-graph representation.

The third approach to achieve a bipartite-graph representation of a multi-hop wireless network may be to inject new network nodes of opposite polarity into the multi-hop wireless network. As an example AND not by way of limitation, a new network node having polarity "E" may be injected into odd cycle 301 between network node 303 and network node 304. This would give the cycle an even length of six, and additionally would ensure that no nodes having the same polarity also have a wireless connection. This approach may require manual installation and be more costly than the two prior approaches.

In particular embodiments, edge bipartization may be executed in response to a change in a topology of the multi-hop wireless network. It may be desirable to perform edge bipartization in certain situations, as IT does not require the removal of any network nodes, and does not require and manual installation or maintenance. Changes to wireless connections may be made automatically according to system settings. Situations in which edge bipartization may be appropriate include, but are not limited to, circumstances in which the topology of the multi-hop wireless network changes. Changes to network topology may be triggered in the following circumstances. First, during or after network ignition (e.g. after installation of one or more network nodes, those network nodes may establish a wireless connection with one or more other network nodes) if the multi-hop wireless network was not ignited as originally planned. Second, after performing an interference analysis, it may be discovered that new wireless connections would be desirable to reduce the overall interference in the network. Such new connections may require edge bipartization because the new connections may result in a graph representation that is not bipartite. Third, adding new nodes to solve coverage or congestion issues may also warrant the application of the edge bipartization algorithm.

In particular embodiments, particular links in the network may be assigned a priority weight. This priority weight may indicate that links assigned the priority weight have a higher priority than links not assigned the priority weight or links assigned a lesser weight. The edge bipartization algorithm may be configured such that links assigned a priority weight above a threshold priority weight may not be designated for removal. In this way, it may be ensured that vital links are not removed as a result of edge bipartization. As an example and not by way of limitation, links surrounding fiber PoP node 305 may take a higher priority than other links. That is, it may be more important for these links to remain ACTIVATED than for other links to remain activated. Thus, these links may be assigned a relatively high priority weight as compared to other links farther away from fiber PoP node 305. As the multi-hop wireless network undergoes edge bipartization after changes to network topology, particular links may be designated for removal. The edge bipartization algorithm may be configured such that links assigned a priority weight above a threshold priority weight (in this example, the links surrounding fiber PoP node 05) may not be designated for removal. In this way, it may be ensured that vital links are not removed as a result of edge bipartization.

Figure 4:
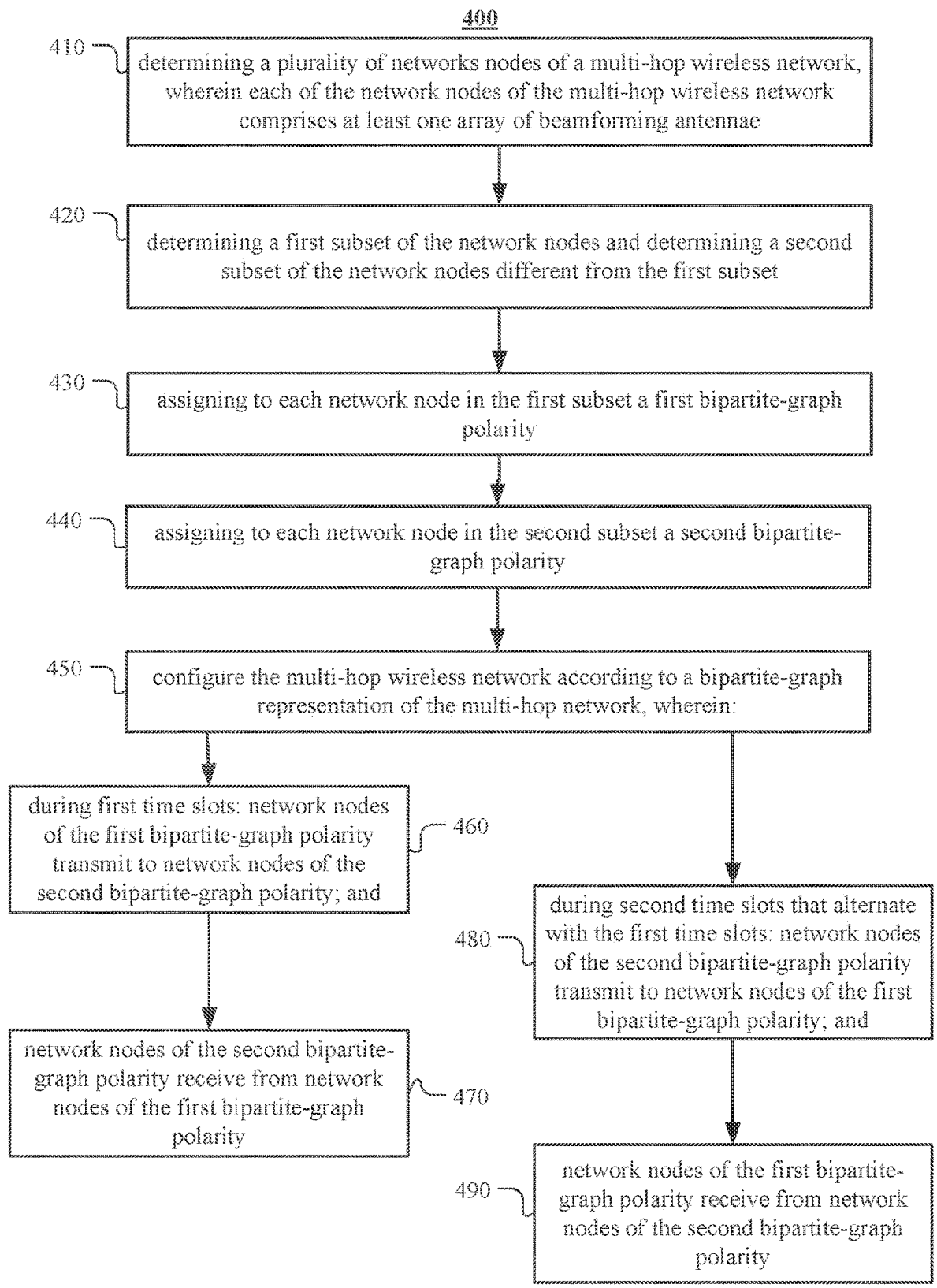
FIG. 4 ILLUSTRATES an example method for assigning polarity to network nodes of a multi-hop wireless network.

FIG. 4 illustrates an example method 400 for assigning polarity to network nodes of a multi-hop wireless network. The method may begin at step 410, wherein a plurality of networks nodes of a multi-hop wireless network may be determined, wherein each of the network nodes of the multi-hop wireless network comprises at least one array of beamforming antennae. At step 420, a first subset of the network nodes may be determined and a second subset of the network nodes different from the first subset may be determined. At step 430, each network node in the first subset may be assigned a first bipartite-graph polarity. Bipartite-graph polarity may be understood to mean that each network node in the first subset may be categorized in one of two categories. As an EXAMPLE and not by way of limitation, network nodes in the first subset may be assigned an "even" bipartite-graph polarity ("even nodes"). At step 440, each network node in the second subset may be assigned a second bipartite-graph polarity. As an example and not by way of limitation, network nodes in the second subset may be assigned an "odd" bipartite-graph polarity ("odd nodes"). At step 450, the multi-hop wireless network may be configured according to a bipartite-graph representation of the multi-hop network. As an example and not by way of limitation, it may be desirable to create a bipartite-graph representation of the multi-hop wireless network by rearranging the representation of the network nodes so that the odd nodes are located on the left side of the graph, and the even nodes are located on the right side of the graph. In the bipartite-graph representation, the network nodes may be referred to as vertices. Additionally, representations of wireless connections between network nodes in the multi-hop network may be drawn as edges 204 and 205 between the vertices on either side of the bipartite-graph representation. At step 460, during first time slots: network nodes of the first bipartite-graph polarity may transmit to network nodes of the second bipartite-graph polarity. At step 470, network nodes of the second bipartite-graph polarity may receive from network nodes of the first bipartite-graph polarity. At step 480, during second time slots that alternate with the first time slots: network nodes of the second bipartite-graph polarity may transmit to network nodes of the first bipartite-graph polarity. At step 490, network nodes of the first bipartite-graph polarity may receive from network nodes of the second bipartite-graph polarity. As an example and not by way of limitation, during first time slots, even nodes may transmit to odd nodes, and odd nodes may receive transmissions from even nodes. During second time slots, the roles may reverse, and odd nodes may transmit to even nodes, and even nodes may receive transmissions from odd nodes. Particular embodiments may repeat one or more steps of the method of FIG. 4, where APPROPRIATE. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for generating and sending tag candidates to a client system including the particular steps of the method of FIG. 4, this disclosure contemplates any suitable method for generating and sending tag candidates to a client system including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or SYSTEMS carrying out any suitable steps of the method of FIG. 4.

In particular embodiments, the method 400 may be executed in conjunction with installation of at least some of the network nodes of the multi-hop wireless network. This may occur in conjunction with initial installation or in conjunction with installation of one or more network nodes after the multi-hop wireless network has operated in the steady state (e.g. after installation and ignition) for a period of time. As an example and not by way of limitation, it may be desirable to perform edge bipartization or another suitable bipartization technique after some, but not all, of the network nodes have been installed. This may enable subsets of network nodes (e.g. subnets) to be implemented and able to operate efficiently prior to the installation of an entire multi-hop wireless network, which may COMPRISE over 10,000 network nodes. Thus, after a particular subnet has been installed and ignited, edge bipartization may be performed on the subnet to ensure the subnet operates as a bipartite graph. In addition to or in place of edge bipartization, it may be desirable to inject new nodes into the subnet at this point, while new network nodes are being installed and installation may be relatively affordable. Thus, instead of disconnecting particular wireless connections, new nodes may be added to the subnet to ensure that it conforms to a bipartite-graph representation. In particular embodiments, the method 400 may further comprise adding one or more new network nodes to the multi-hop wireless network and assigning to each of the new network nodes the first bipartite-graph polarity or the second bipartite-graph polarity to conform the wireless multi-hop network to the bipartite-graph representation. This polarity assignment may be necessary to ensure that the multi-hop wireless network operates as a bipartite graph.

Additionally, whenever a new node or batch of new nodes is installed and ignited in the multi-hop wireless network, it may be desirable to perform an edge bipartization to ensure the multi-hop wireless network with, the new node(s), conforms to a bipartite-graph representation.

As discussed herein, in particular embodiments, the method 400 may be executed in response to a change in a topology of the multi-hop wireless network. It may be desirable to perform edge bipartization in certain situations, as it does not require the removal of any network nodes, and does not require and manual installation or maintenance. In particular embodiments, the change in a topology of the multi-hop wireless network may comprise one or more of the following: the failure of one or MORE wireless connections between network nodes; the creation of one or more new wireless connections between network nodes; the addition of one or more new network nodes; or one or more changes to an interference measurement on the multi-hop wireless network. The failure of one or more wireless connections between network nodes may be caused by a variety of external and internal forces, including, but not limited to, severe weather, construction or demolition of buildings, tampering by third parties, internal malfunctions, and the like. The creation of one or more new wireless connections between network nodes may result from the network nodes either intelligently (e.g. automatically) discovering that new wireless connections may help the network operate more efficiently and with better coverage, or from a directive from the central controller 140. New wireless connections may be created as a result from firmware updates or other suitable software or hardware updates to one or more network nodes. The addition of one or more new network nodes may result from new network nodes being installed on the multi-hop wireless network or existing nodes being repaired after being inoperable for a period of time. One or more changes to an interference measurement on the multi-hop wireless network may result from the interference on the multi-hop wireless network being measured. Ideally, the interference measured on the multi-hop wireless network may be as low as possible. If the measured interference rises for either known or unknown reasons, performing edge bipartization or other bipartization technique may help to identify wireless connections that may need to be disconnected to reduce interference on the network.

In particular embodiments, the method 400 may further comprise changing the assigned bipartite-graph polarities of one or more of the network nodes based on an application of: an Odd Cycle Transversal (OCT) algorithm to a topology of the multi-hop wireless network; or an Edge Bipartization (EBP) algorithm to the topology of the multi-hop wireless network. Changing the polarity of one or more network nodes may be performed in addition to or in place of removing one or more wireless connections. As an example and not by way of limitation, it may be desirable to change the assigned polarity of network node 303 from odd to even upon the execution of a bipartization technique. Alternatively, changing the assigned polarity of a network node may not need to occur upon the execution of a bipartization technique; the change of polarity may occur independently.

Changing the polarity of one or more of the network nodes may be executed in conjunction with installation of at least some of the network nodes of the multi-hop wireless network. The change of POLARITY may occur in conjunction with initial installation or in conjunction with installation of one or more network nodes after the multi-hop wireless network has operated in the steady state (e.g. after installation and ignition) for a period of time. As an example and not by way of limitation, it may be desirable to change the polarity of one or more network nodes after some, but not all, of the network nodes have been installed. This may enable subsets of network nodes (e.g. subnets) to be implemented and able to operate efficiently prior to the installation of an entire multi-hop wireless network, which may comprise over 10,000 network nodes. Thus, after a particular subnet has been installed and ignited, one or more network nodes in the subnet may undergo a change of polarity to ensure the subnet operates as a bipartite graph. In addition to or in place of changing the polarity of one or more network nodes, it may be desirable to inject new nodes into the subnet at this point, while new network nodes are being installed and installation may be relatively affordable. Thus, instead of changing polarities, new nodes may be added to the subnet to ensure that it conforms to a bipartite-graph representation. As an example and not by way of limitation, if two even nodes are connected by a wireless connection, an odd node may be placed between the two even nodes, so that the transmission may follow an even-odd-even network-node path. This may be done in place of changing the polarity of one of the even nodes to an odd polarity.

Figure 5:
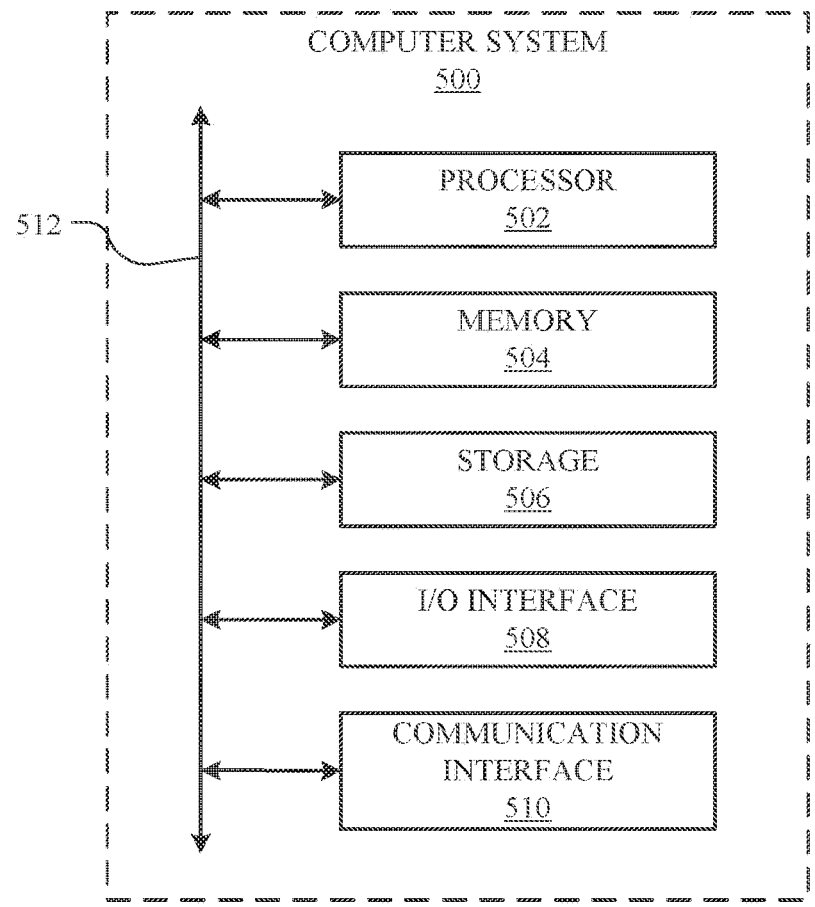
FIG. 5 ILLUSTRATES and example computer system.

FIG. 5 illustrates an example computer system 500. In particular embodiments, one or more computer systems 500 perform one or more steps of one or more methods described or ILLUSTRATED herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main MEMORY for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular EMBODIMENTS, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated GRAPHICS Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated OTHERWISE by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, OR operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   determining a plurality of network nodes of a multi-hop wireless network, wherein each of the plurality of network nodes of the multi-hop wireless network comprises at least one array of beamforming antennae;
   assigning a first bipartite-graph polarity to each network node in a first subset of network nodes in the plurality of network nodes;
   assigning a second bipartite-graph polarity to each network node in a second subset of network nodes in the plurality of network nodes;
   configuring the multi-hop wireless network according to a bipartite-graph representation of the multi-hop wireless network, wherein:
      during first time slots:
         network nodes of the first bipartite-graph polarity transmit to network nodes of the second bipartite-graph polarity, and
         network nodes of the second bipartite-graph polarity receive from network nodes of the first bipartite-graph polarity, and
      during second time slots that alternate with the first time slots:
         network nodes of the second bipartite-graph polarity transmit to network nodes of the first bipartite-graph polarity, and
         network nodes of the first bipartite-graph polarity receive from network nodes of the second bipartite-graph polarity; and
   changing, responsive to a change in a topology of a multi-hop wireless network, the assigned bipartite-graph polarities of one or more of the plurality of network nodes based on an application of an Edge Bipartization (EBP) algorithm to the topology of the multi-hop wireless network, the Edge Bipartization algorithm configured to designate one or more wireless connections for removal, wherein the change in the topology comprises a change to a total number of network nodes and a total number of wireless connections in the multi-hop wireless network.

2. The method of claim 1, wherein the method is executed in conjunction with installation of at least some of the network nodes of the multi-hop wireless network.

3. The method of claim 1, wherein the change to the total number of network nodes and the total number of wireless connections in the multi-hop wireless network comprises one or more of:
   failure of one or more wireless connections between network nodes;
   creation of one or more new wireless connections between network nodes;
   addition of one or more new network nodes; or
   creation of one or more new wireless connections between network nodes in response to one or more changes to an interference measurement on the multi-hop wireless network.

4. The method of claim 1, further comprising adding one or more new network nodes to the multi-hop wireless network and assigning to each of the new network nodes the first bipartite-graph polarity or the second bipartite-graph polarity to conform the wireless multi-hop network to the bipartite-graph representation.

5. The method of claim 1, further comprising changing the assigned bipartite-graph polarities of one or more of the network nodes based on an application of an Odd Cycle Transversal (OCT) algorithm to the topology of the multi-hop wireless network.

6. The method of claim 5, wherein the Odd Cycle Transversal algorithm is configured to designate one or more of the plurality of network nodes for removal, wherein one or more of the plurality of network nodes are not designated for removal based on the one or more wireless connections assigned a priority weight above a threshold priority weight.

7. The method of claim 1, wherein one or more new wireless connections are created between the plurality of network nodes in response to one or more of a firmware update, a software update, a hardware update, or a hardware repair to one or more of the plurality of network nodes.

8. The method of claim 1, wherein the change in the topology of the multi-hop wireless network further comprises one or more wireless connections between one or more pairs of network nodes assigned the same bipartite-graph polarity.

9. The method of claim 8, further comprising, for one or more of the pairs of network nodes assigned the same bipartite-graph polarity, adding a new network node between the network nodes of the network node pair, wherein the new network node is assigned a different bipartite-graph polarity than the pair of network nodes.

10. One or more non-transitory computer readable media storing instructions that, when executed by one or more processors, cause the one or more processors to perform the steps of:
   determining a plurality of network nodes of a multi-hop wireless network, wherein each of the plurality of network nodes of the multi-hop wireless network comprises at least one array of beamforming antennae;
   assigning a first bipartite-graph polarity to each network node in a first subset of network nodes in the plurality of network nodes;
   assigning a second bipartite-graph polarity to each network node in a second subset of network nodes in the plurality of network nodes;
   configuring the multi-hop wireless network according to a bipartite-graph representation of the multi-hop wireless network, wherein:
      during first time slots:
         network nodes of the first bipartite-graph polarity transmit to network nodes of the second bipartite-graph polarity, and
         network nodes of the second bipartite-graph polarity receive from network nodes of the first bipartite-graph polarity, and
      during second time slots that alternate with the first time slots:
         network nodes of the second bipartite-graph polarity transmit to network nodes of the first bipartite-graph polarity, and network nodes of the first bipartite-graph polarity receive from network nodes of the second bipartite-graph polarity; and changing, responsive to a change in a topology of a multi-hop wireless network, the assigned bipartite-graph polarities of one or more of the plurality of network nodes based on an application of an Edge Bipartization (EBP) algorithm to the topology of the multi-hop wireless network, the Edge Bipartization algorithm configured to designate one or more wireless connections for removal, wherein the change in the topology comprises a change to a total number of network nodes and a total number of wireless connections in the multi-hop wireless network.

11. The one or more non-transitory computer readable media of claim 10, wherein the steps are executed in conjunction with installation of at least some of the network nodes of the multi-hop wireless network.

12. The one or more non-transitory computer readable media of claim 10, wherein the change to the total number of network nodes and the total number of wireless connections in the multi-hop wireless network comprises one or more of:
    failure of one or more wireless connections between network nodes;
    creation of one or more new wireless connections between network nodes;
    addition of one or more new network nodes; or
    creation of one or more new wireless connections between network nodes in response to one or more changes to an interference measurement on the multi-hop wireless network.

13. The one or more non-transitory computer readable media of claim 10, further comprising adding one or more new network nodes to the multi-hop wireless network and assigning to each of the new network nodes the first bipartite-graph polarity or the second bipartite-graph polarity to conform the wireless multi-hop network to the bipartite-graph representation.

14. The one or more non-transitory computer readable media of claim 10, further comprising changing the assigned bipartite-graph polarities of one or more of the network nodes based on an application of an Odd Cycle Transversal (OCT) algorithm to the topology of the multi-hop wireless network.

15. The one or more non-transitory computer readable media of claim 14, wherein the Odd Cycle Transversal algorithm is configured to designate one or more of the plurality of network nodes for removal, wherein one or more of the plurality of network nodes are not designated for removal based on the one or more wireless connections assigned a priority weight above a threshold priority weight.

16. The one or more non-transitory computer readable media of claim 10, wherein one or more new wireless connections are created between the plurality of network nodes in response to one or more of a firmware update, a software update, a hardware update, or a hardware repair to one or more of the plurality of network nodes.

17. The one or more non-transitory computer readable media of claim 10, wherein the change in the topology of the multi-hop wireless network further comprises one or more wireless connections between one or more pairs of network nodes assigned the same bipartite-graph polarity.

18. The one or more non-transitory computer readable media of claim 17, further comprising, for one or more of the pairs of network nodes assigned the same bipartite-graph polarity, adding a new network node between the network nodes of the network node pair, wherein the new network node is assigned a different bipartite-graph polarity than the pair of network nodes.

19. A system comprising:
    a memory storing instructions; and
    one or more processors that execute the instructions to:
        determine a plurality of network nodes of a multi-hop wireless network, wherein each of the plurality of network nodes of the multi-hop wireless network comprises at least one array of beamforming antennae,
        assign a first bipartite-graph polarity to each network node in a first subset of network nodes in the plurality of network nodes,
        assign a second bipartite-graph polarity to each network node in a second subset of network nodes in the plurality of network nodes,
        configure the multi-hop wireless network according to a bipartite-graph representation of the multi-hop wireless network, wherein:
            during first time slots:
                network nodes of the first bipartite-graph polarity transmit to network nodes of the second bipartite-graph polarity, and
                network nodes of the second bipartite-graph polarity receive from network nodes of the first bipartite-graph polarity, and
            during second time slots that alternate with the first time slots:
                network nodes of the second bipartite-graph polarity transmit to network nodes of the first bipartite-graph polarity, and
                network nodes of the first bipartite-graph polarity receive from network nodes of the second bipartite-graph polarity, and
        change, responsive to a change in a topology of a multi-hop wireless network, the assigned bipartite-graph polarities of one or more of the plurality of network nodes based on an application of an Edge Bipartization (EBP) algorithm to the topology of the multi-hop wireless network, the Edge Bipartization algorithm configured to designate one or more wireless connections for removal, wherein the change in the topology comprises a change to a total number of network nodes and a total number of wireless connections in the multi-hop wireless network.

20. The system claim 19, wherein the change to the total number of network nodes and the total number of wireless connections in the multi-hop wireless network comprises one or more of:
    failure of one or more wireless connections between network nodes;
    creation of one or more new wireless connections between network nodes;
    addition of one or more new network nodes; or
    creation of one or more new wireless connections between network nodes in response to one or more changes to an interference measurement on the multi-hop wireless network.

* * * * *